(12) United States Patent
Cortes Saenz et al.

(10) Patent No.: US 9,604,671 B2
(45) Date of Patent: Mar. 28, 2017

(54) VEHICLE UNDERBODY STRUCTURE

(71) Applicants: Juan Simon Cortes Saenz, Mexico City (MX); Carlos Armando Quinto Tapia, Mexico City (MX)

(72) Inventors: Juan Simon Cortes Saenz, Mexico City (MX); Carlos Armando Quinto Tapia, Mexico City (MX)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 14/825,695

(22) Filed: Aug. 13, 2015

(65) Prior Publication Data

US 2017/0043809 A1    Feb. 16, 2017

(51) Int. Cl.
*B62D 21/03*     (2006.01)
*B62D 33/02*     (2006.01)

(52) U.S. Cl.
CPC ............ *B62D 21/03* (2013.01); *B62D 33/02* (2013.01)

(58) Field of Classification Search
CPC ........ B62D 21/03; B62D 21/05; B62D 21/06; B62D 21/07; B62D 25/20; B62D 25/2027; B62D 33/02
See application file for complete search history.

(56) References Cited

U.S. PATENT DOCUMENTS

| | | | | |
|---|---|---|---|---|
| 953,509 A * | 3/1910 | Bird | ........................ | B62D 33/02 296/14 |
| 4,412,699 A * | 11/1983 | Peruzzi | .................. | B62D 33/02 280/656 |
| 5,259,661 A * | 11/1993 | Thum | .................... | B62D 21/08 296/203.01 |
| 5,322,314 A * | 6/1994 | Blum | ..................... | B62D 21/20 280/400 |
| 6,170,905 B1 | 1/2001 | Jurica | | |
| 6,183,013 B1 | 2/2001 | Mackenzie | | |
| 6,533,348 B1 | 3/2003 | Jaekel | | |
| 6,702,365 B2 | 3/2004 | Semple | | |
| 6,764,559 B2 | 7/2004 | Li | | |

(Continued)

FOREIGN PATENT DOCUMENTS

| | | |
|---|---|---|
| AU | 2001250219 | 8/2005 |
| CA | 2406456 | 11/2001 |

(Continued)

*Primary Examiner* — Glenn Dayoan
*Assistant Examiner* — Paul Chenevert
(74) *Attorney, Agent, or Firm* — Ralph E. Smith

(57) ABSTRACT

An underbody structure for a vehicle cargo bed is provided. The underbody structure includes a front cross member defining a forward end of the underbody structure, a rear cross member defining an opposite rearward end of the underbody structure, a first side member coupled between the front cross member and the rear cross member, and a second opposite side member coupled between the front cross member and the rear cross member. The underbody structure includes a center cross member coupled between the first and second side members, a first angled cross member oriented at a predetermined acute angle relative to the rear cross member, and a second angled cross member oriented at a predetermined acute angle relative to the rear cross member, where the first and second angled cross members are configured to match a load distribution of the vehicle cargo bed.

16 Claims, 4 Drawing Sheets

(56) References Cited

U.S. PATENT DOCUMENTS

| | | |
|---|---|---|
| 6,948,768 B2 | 9/2005 | Corcoran |
| 6,960,090 B2 | 11/2005 | Denter |
| 6,994,363 B2 | 2/2006 | Seksaria |
| 7,152,911 B1 | 12/2006 | McNulty |
| 7,338,115 B2 * | 3/2008 | Rocheblave ......... B62D 21/152 296/187.11 |
| 7,575,264 B1 | 8/2009 | Solomon |
| 7,665,800 B2 | 2/2010 | Werner |
| 7,731,271 B2 | 6/2010 | Shelbo |
| 7,765,699 B2 | 8/2010 | Corcoran |
| 7,819,463 B2 | 10/2010 | Werner |
| 7,905,541 B2 * | 3/2011 | Yamaguchi ......... B62D 25/087 296/203.04 |
| 9,150,182 B1 * | 10/2015 | Schlangen ............... B60G 3/20 |
| 9,346,346 B2 * | 5/2016 | Murray .................... B60K 1/04 |
| 9,446,793 B2 * | 9/2016 | Choi ..................... B62D 25/20 |
| 2001/0040387 A1 * | 11/2001 | Takagi ................. B62D 29/008 296/204 |
| 2003/0001409 A1 | 1/2003 | Semple |
| 2003/0047964 A1 | 3/2003 | Jurica |
| 2004/0094245 A1 | 5/2004 | Li |
| 2004/0227368 A1 | 11/2004 | Seksaria |
| 2004/0232731 A1 | 11/2004 | Corcoran |
| 2005/0225120 A1 | 10/2005 | Womack |
| 2005/0274017 A1 | 12/2005 | Corcoran |
| 2006/0055207 A1 * | 3/2006 | Reinhardt ............. B62D 25/20 296/193.07 |
| 2006/0170205 A1 * | 8/2006 | Ramsey ................ B62D 21/02 280/789 |
| 2007/0085381 A1 | 4/2007 | Delaney |
| 2007/0107964 A1 * | 5/2007 | Bunsmann ............ B60G 7/003 180/165 |
| 2015/0151795 A1 * | 6/2015 | Boettcher ............ B62D 33/023 296/26.08 |
| 2016/0052556 A1 * | 2/2016 | Kano ..................... B62D 21/11 296/187.08 |
| 2016/0083011 A1 * | 3/2016 | Kawaguchi ............ B62D 21/02 296/203.01 |

FOREIGN PATENT DOCUMENTS

| | | | |
|---|---|---|---|
| CA | 2460902 | 4/2003 | |
| CN | 1223485 | 10/2005 | |
| CN | 100441465 | 12/2008 | |
| DE | 4442741 A1 * | 6/1996 | ............ B62D 21/02 |
| DE | 60208401 | 9/2006 | |
| DE | 102011015624 A1 * | 11/2011 | ............ B62D 21/06 |
| DE | 102011053246 A1 * | 3/2013 | ............ B62D 21/06 |
| EP | 1276657 | 1/2003 | |
| EP | 1432606 | 6/2004 | |
| FR | 671635 A * | 12/1929 | ............ B62D 21/06 |
| FR | 957763 A * | 2/1950 | ............ B62D 21/06 |
| FR | 1135363 A * | 4/1957 | ............ B60F 5/003 |
| FR | EP 0926047 A1 * | 6/1999 | ............ B62D 21/02 |
| FR | 3007377 A1 * | 12/2014 | ............ B62D 25/20 |
| FR | 3031338 A1 * | 7/2016 | ............. B60P 1/286 |
| JP | WO 2015056527 A1 * | 4/2015 | ........... B62D 25/025 |
| WO | 2001081154 | 11/2001 | |
| WO | 03029069 | 4/2003 | |
| WO | WO 2006112903 A1 * | 10/2006 | ............. B21D 53/88 |

\* cited by examiner

VEHICLE UNDERBODY STRUCTURE

FIELD

The present application relates generally to an underbody structure for a vehicle and, more particularly, to a truck box underbody structure.

BACKGROUND

Pickup truck cargo beds are generally secured along the length of a vehicle frame with a support structure, which typically includes two generally parallel frame members interconnected and spaced apart by cross members to create what is commonly known as a ladder frame. However, such known support structures for cargo beds do not always match load distribution patterns of the vehicle, which may result in poor body stiffness. Further, conventional cargo beds may experience potential durability concerns such as cracking, corrosion, or other structural issues, which may be produced or magnified when the cargo bed support structures do not match the load distribution patterns. Accordingly, it is desirable to provide an improved cargo bed or vehicle underbody structure to more closely match the load distribution patterns of the vehicle.

SUMMARY

In accordance with one exemplary aspect of the invention, an underbody structure for a vehicle cargo bed is provided. In one implementation, the underbody structure includes a front cross member defining a forward end of the underbody structure, a rear cross member defining an opposite rearward end of the underbody structure, a first side member coupled between the front cross member and the rear cross member, and a second opposite side member coupled between the front cross member and the rear cross member. The underbody structure further includes at least one center cross member coupled between the first side member and the second side member, a first angled cross member oriented at a first predetermined acute angle relative to the rear cross member, and a second angled cross member oriented at a second predetermined acute angle relative to the rear cross member, the first and second angled cross members configured to match a load distribution of the vehicle cargo bed.

In accordance with another exemplary aspect of the invention, a vehicle is provided. In one implementation, the vehicle includes a chassis and a truck box underbody structure supported by the chassis. The truck box underbody structure includes, in an exemplary implementation, a front cross member defining a forward end of the underbody structure, a rear cross member defining an opposite rearward end of the underbody structure, a first side member coupled between the front cross member and the rear cross member, and a second side member coupled between the front cross member and the rear cross member. The underbody structure further includes at least one center cross member coupled between the first side member and the second opposite side member; a first angled cross member oriented at a first predetermined acute angle relative to the rear cross member, and a second angled cross member oriented at a second predetermined acute angle relative to the rear cross member, the first and second angled cross members configured to match a load distribution of the vehicle cargo bed.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings references therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

Figure 1:
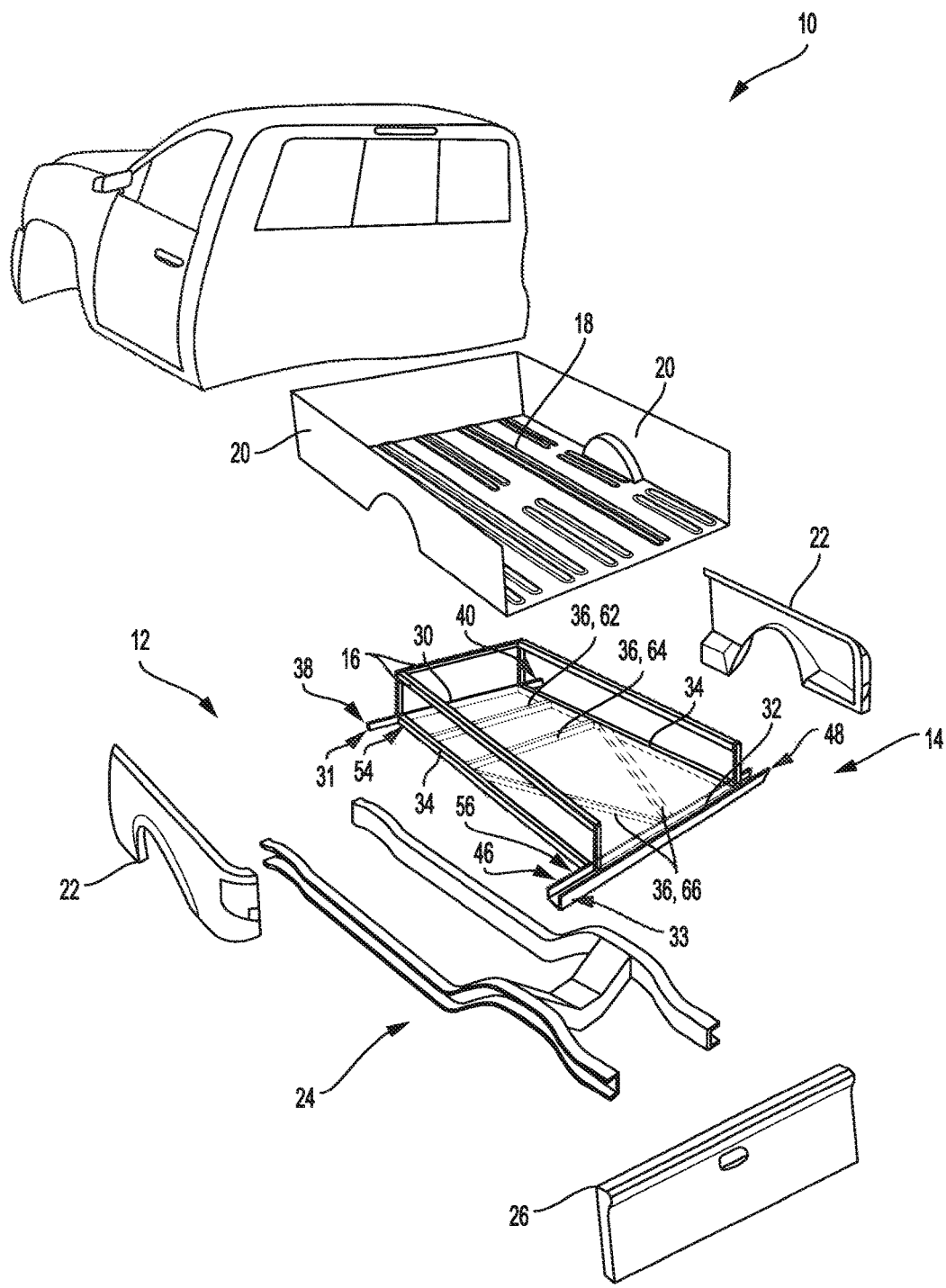
FIG. 1 is an exploded perspective view of an exemplary underbody structure for a vehicle in accordance with the principles of the present disclosure.

With initial reference to FIG. 1, an exemplary vehicle 10 having a cargo bed assembly 12 is illustrated. In an exemplary embodiment, vehicle 10 is illustrated as a pickup truck. However, vehicle 10 may be any type of vehicle configured to accommodate a cargo bed assembly, load bed assembly or vehicle underbody structure as described herein.

Cargo bed assembly 12 is typically used for storing and/or hauling cargo and includes, among other features, an exemplary truck box underbody structure 14 with one or more sidewalls 16 extending upwardly therefrom. As illustrated in FIG. 1, cargo bed assembly 12 includes three sidewalls 16. However, cargo bed assembly 12 may have any suitable number of sidewalls 16.

In the exemplary embodiment, cargo bed assembly 12 includes a box floor panel 18, inner box panels 20, and outer side body panels 22 coupled to the truck box underbody structure 14 and/or sidewalls 16. Underbody structure 14 is coupled to and supported by a chassis 24 of vehicle 10. In the illustrated embodiment, a tailgate 26 is movably coupled to cargo bed assembly 12 as a fourth sidewall of assembly 12 and is configured to move between an open position and a closed position.

Figure 2:
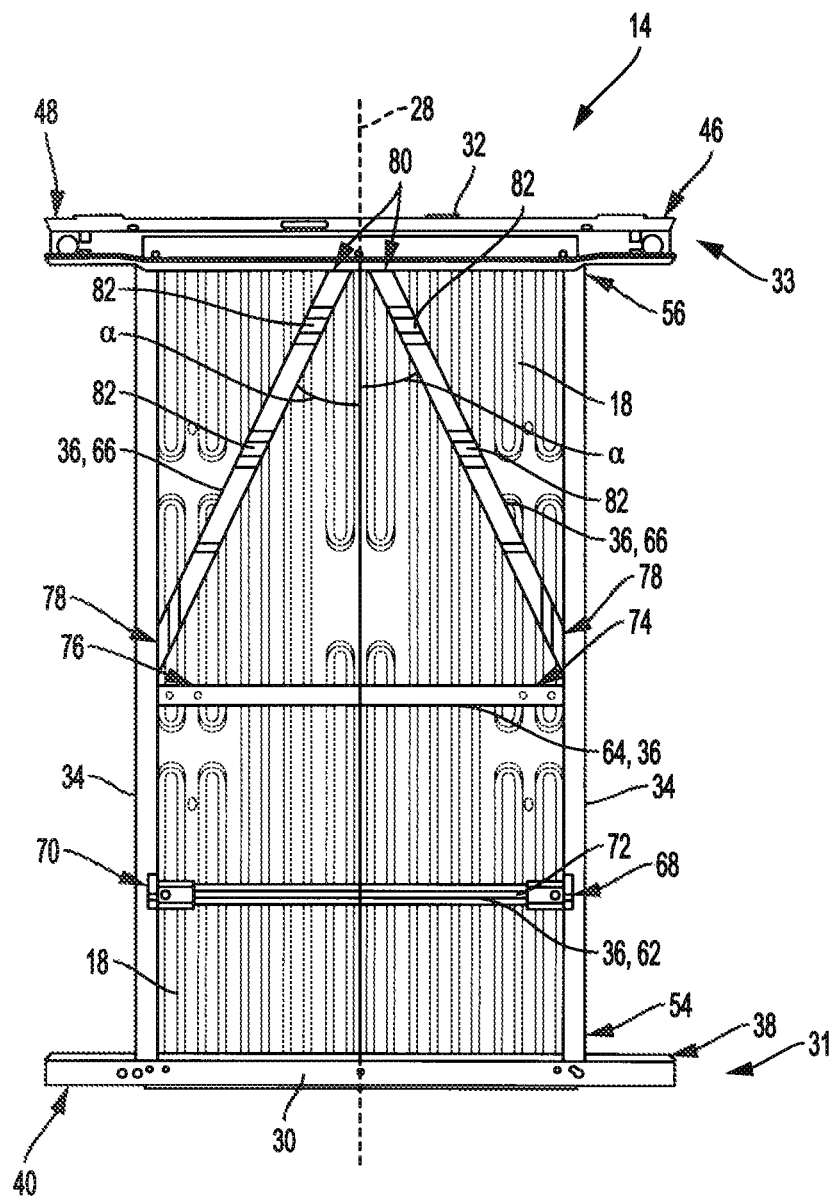
FIG. 2 is a bottom view of the underbody structure shown in FIG. 1 with an exemplary floor panel in accordance with the principles of the present disclosure.
Figure 3:
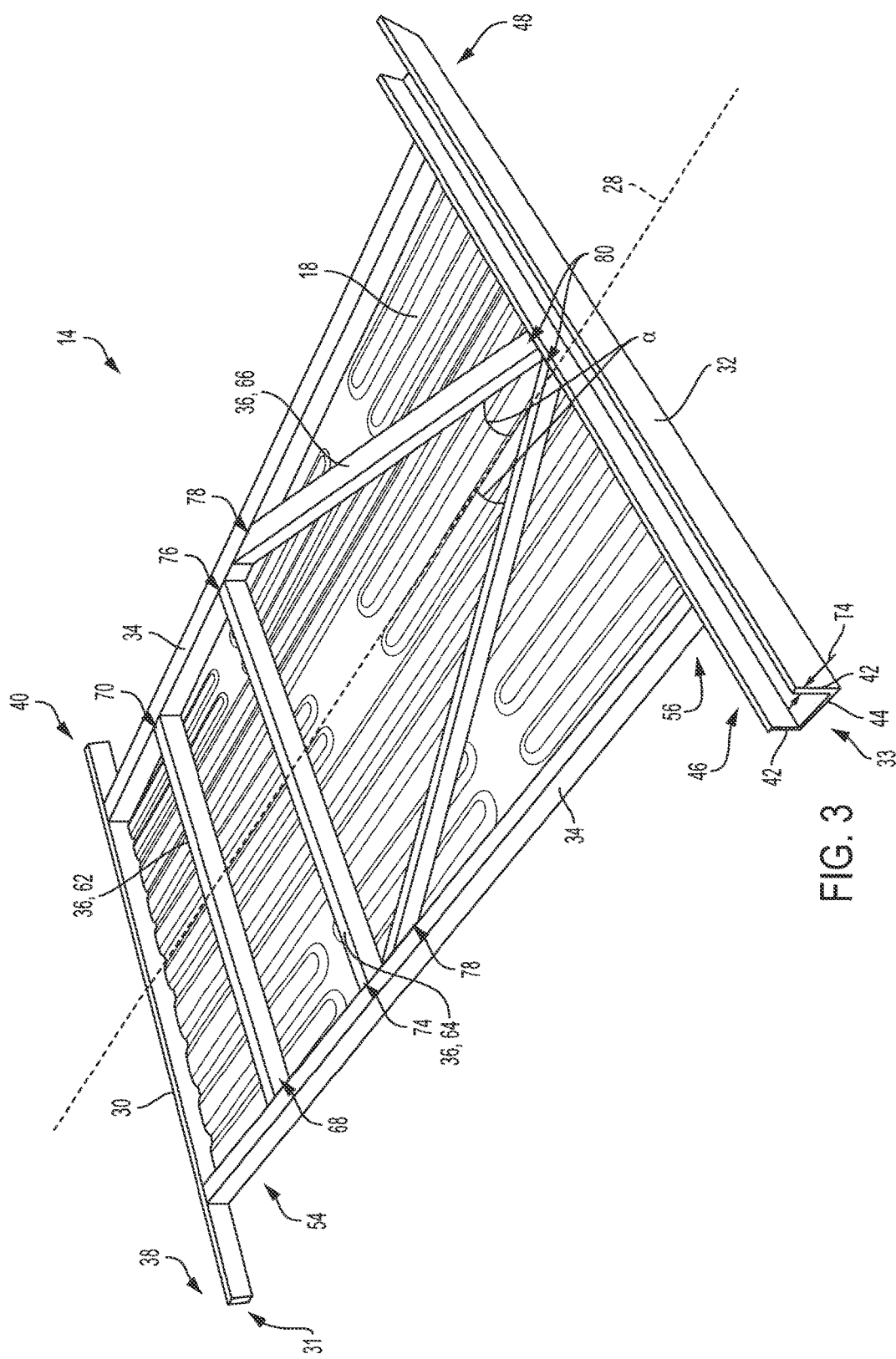
FIG. 3 is a bottom perspective view of the underbody structure shown in FIG. 1 with an exemplary floor panel in accordance with the principles of the present disclosure.
Figure 4:
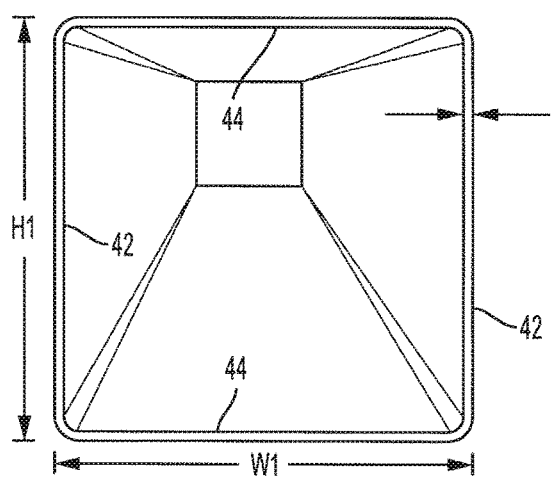
FIG. 4 is a perspective view of an exemplary front cross member of the underbody structure shown in FIGS. 1-3 in accordance with the principles of the present disclosure.

With additional reference to FIGS. 2 and 3, the truck box underbody structure 14 will be discussed in greater detail and generally includes a front cross rail or member 30, a rear cross member 32, side members 34, and cross members 36. In the exemplary embodiment, front cross member 30 defines a forward first end 31 of underbody structure 14 and includes a first end 38 and an opposite second end 40. Front cross member 30 is positioned toward a front of vehicle 10 and extends perpendicular to or substantially perpendicular to a longitudinal axis 28 of vehicle 10 that extends between the vehicle front and the vehicle rear or back. As shown in FIG. 4, front cross member 30 includes a closed, rectangular cross-section formed by opposed walls 42 and opposed walls 44. As such, front cross member 30 is at least partially defined by a width W1, a height H1, and a wall thickness T1.

In the exemplary embodiment, rear cross member 32 defines a rearward second end 33 of underbody structure 14 and includes a first end 46 and a second opposite end 48. Rear cross member 32 is positioned toward a rear of vehicle 10 proximate tailgate 26 and extends parallel to or substantially parallel to front cross member 30. Rear cross member 32 includes a three-sided, U-shaped cross-section formed by opposed walls 42 and connecting wall 44 which have a wall thickness T4 (see FIG. 3).

Figure 5:
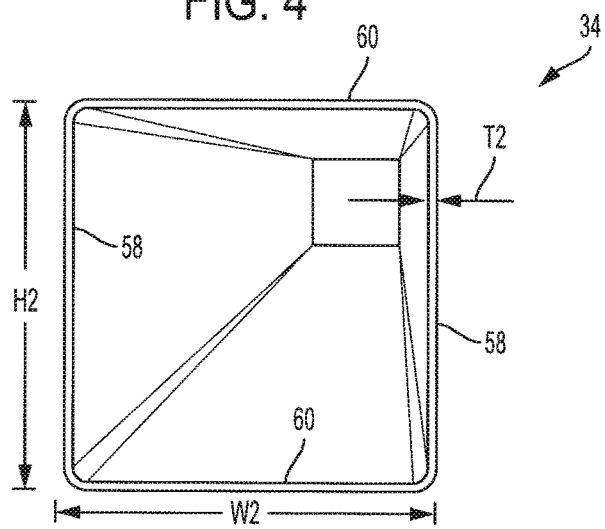
FIG. 5 is a perspective view of an exemplary side member of the underbody structure shown in FIGS. 1-3 in accordance with the principles of the present disclosure.

In the exemplary embodiment, side members 34 each include a first end 54 and an opposite second end 56. Side members 34 extend along a length of truck box underbody structure 14 parallel to or substantially parallel to longitudinal axis 28. Side member first ends 54 are coupled to front cross member 30, and side member second ends 56 are coupled to rear cross member 32. As illustrated in FIG. 5, side members 34 each include a closed, rectangular cross-section formed by opposed walls 58 and opposed walls 60. As such, side members 34 are each at least partially defined by a width W2, a height H2, and a wall thickness T2.

In the exemplary embodiment, cross members 36 include a plurality of members extending between front cross member 30, rear cross member 32, and/or side members 34. In particular, cross members 36 include one or more front zone cross member 62, one or more center cross member 64, and one or more angled cross members 66. In the illustrated embodiment, cross members 36 include only a single front zone cross member 62, a single cross member 64, and two angled cross members 66, where the members 30, 32, 62 and 64 are parallel or substantially parallel to each other. This improved configuration serves to minimize vehicle weight while also particularly matching the load distribution pattern of the vehicle proximate the cargo bed, as described in greater detail herein.

Front zone cross member 62 includes a first end 68, an opposite second end 70, and one or more channel 72 extending therebetween. First end 68 is coupled to one side member 34, and second end 70 is coupled to the other side member 34. Channel 72 is configured to provide front zone cross member 62 with a cross-sectional shape that improves stiffness and provides increased match to load path. In the illustrated embodiment, front zone cross member 62 includes only a single channel 72. Center cross member 64 is disposed rearward of front zone cross member 62 and includes a first end 74 and an opposite second end 76. First end 74 is coupled to one side member 34, and second end 76 is coupled to the other side member 34. Front zone cross member 62 and center cross member 64 are each disposed parallel to or substantially parallel to front cross member 30 and rear cross member 32.

In the exemplary embodiment, angled cross members 66 each include a first end 78 and an opposite second end 80. Each first end 78 is coupled to one side member 34, and each second end 80 is coupled to rear cross member 32. Angled cross members 66 facilitate distributing forces, which reduces stresses acting on the truck box, which thereby improves component performance and life. As shown in the illustrated embodiment, lateral cross members are not present in the portion of underbody structure 14 having angled cross members 66, thereby reducing weight of the vehicle while also providing a support structure that matches the load distribution pattern of the vehicle.

Angled cross members 66 are disposed at an angle 'α' relative to central longitudinal axis 28 such that angled cross members 66 converge toward each other as they extend toward the rear of vehicle 10. In the exemplary embodiment, angle 'α' is an acute angle. In the exemplary embodiment, each angled cross member 66 is disposed at the same angle 'α'. However, in other embodiments, cross members 66 may extend at different angles relative to axis 28. In the exemplary embodiment, second ends 80 are coupled at a midpoint of rear cross member 32. In an exemplary embodiment, the first and second angled cross members 66 extend at an acute angle relative to the rear cross member 32, the respective side members 34, the center cross member 64 and the central longitudinal axis 28 of the vehicle. As shown in FIG. 2, angled cross members 66 include one or more notches or channels 82 formed therein configured to accommodate surrounding structure and/or to improve stiffness of angled cross members 66.

Figure 6:
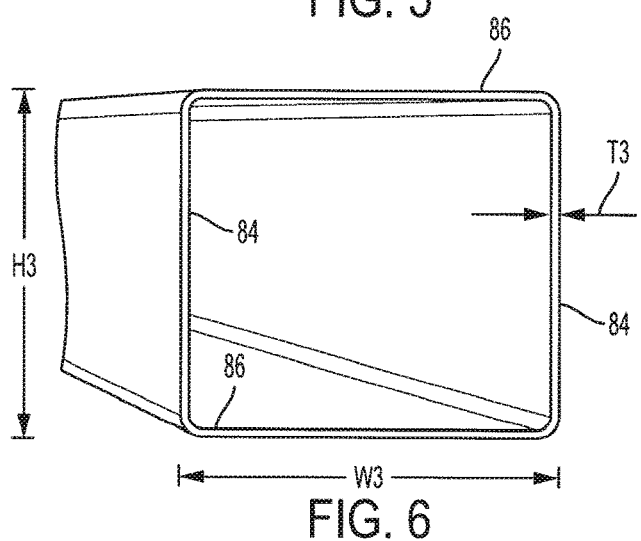
FIG. 6 is a perspective view of an exemplary cross member of the underbody structure shown in FIGS. 1-3 in accordance with the principles of the present disclosure.

As illustrated in FIG. 6, cross members 36 each include a closed, rectangular cross section formed by opposed walls 84 and opposed walls 86. As such, cross members 36 are each at least partially defined by a width W3, a height H3, and a wall thickness T3. In the exemplary embodiment, thickness T3 is smaller than thickness T1, which is smaller than thickness T2.

In one embodiment, width W1 is between approximately 65 mm and approximately 75 mm, H1 is between approximately 70 mm and approximately 80 mm, and/or thickness T1 is between approximately 0.85 mm and approximately 0.95 mm. In another embodiment, width W1 is between 65 mm and 75 mm, H1 is between 70 mm and 80 mm, and/or thickness T1 is between 0.85 mm and 0.95 mm. In yet another embodiment, width W1 is approximately 72.2 mm, height H1 is approximately 74.2 mm, and/or thickness T1 is approximately 0.91 mm. In yet another embodiment, width W1 is 72.2 mm, height H1 is 74.2 mm, and/or thickness T1 is 0.91 mm.

In one embodiment, width W2 is between approximately 70 mm and approximately 80 mm, H2 is between approximately 60 mm and approximately 70 mm, and/or T2 is between approximately 1.0 mm and approximately 1.1 mm. In another embodiment, width W2 is between 70 mm and 80 mm, H2 is between 60 mm and 70 mm, and/or T2 is between 1.0 mm and 1.1 mm. In yet another embodiment, width W2 is approximately 72.2 mm, H2 is approximately 68.2 mm, and/or T2 is approximately 1.04 mm. In yet another embodiment, width W2 is 72.2 mm, H2 is 68.2 mm, and/or T2 is 1.04 mm.

In one embodiment, width W3 is between approximately 75 mm and approximately 85 mm, height H3 is between approximately 55 mm and approximately 65 mm, and/or T3 is between approximately 0.75 mm and approximately 0.85 mm. In another embodiment, width W3 is between 75 mm and 85 mm, height H3 is between 55 mm and 65 mm, and/or T3 is between 0.75 mm and 0.85 mm. In yet another embodiment, width W3 is approximately 79.4 mm, height H3 is approximately 61.3 mm, and/or T3 is approximately 0.77 mm. In yet another embodiment, width W3 is 79.4 mm, height H3 is 61.3 mm, and/or T3 is 0.77 mm.

The features and geometries of truck box underbody structure 14 may be varied to reduce overall weight thereof and/or match the load distribution pattern of the vehicle. In one embodiment, width W2 is between approximately 60 mm and approximately 70 mm, and/or H2 is between approximately 55 mm and approximately 65 mm. In another embodiment, width W2 is between 60 mm and 70 mm, and/or H2 is between 55 mm and 65 mm. In yet another embodiment, width W2 is approximately 65 mm, and/or H2 is approximately 61.4 mm. In yet another embodiment, width W2 is 65 mm, and/or H2 is 61.4 mm.

In one embodiment, width W3 is between approximately 50 mm and approximately 60 mm. In another embodiment, width W3 is between 50 mm and 60 mm. In yet another embodiment, width W3 is approximately 57.8 mm. In yet another embodiment, width W3 is 57.8 mm.

In one embodiment, thickness T4 is between approximately 0.8 mm and approximately 1.0 mm. In another embodiment, thickness T4 is between 0.8 mm and 1.0 mm. In yet another embodiment, thickness 14 is approximately 0.91 mm. In yet another embodiment, thickness T4 is 0.91 mm.

Described herein are systems providing vehicle cargo box support. The systems include a vehicle underbody structure with an improved structural configuration and structural member geometry to better match vehicle load paths. The vehicle underbody structure includes various structural members having optimized closed geometries that are fabricated from a high strength material (e.g., steel, dual phase 590) having a predetermined thickness or gage. As such, the described system provides reduced mass and improves overall performance by better matching the existing load paths of motor vehicles.

It should be understood that the mixing and matching of features, elements and/or functions between various examples may be expressly contemplated herein so that one skilled in the art would appreciate from the present teachings that features, elements and/or functions of one example may be incorporated into another example as appropriate, unless described otherwise above.

What is claimed is:

1. An underbody structure for a vehicle cargo bed, the underbody structure comprising:
    a front cross member defining a forward end of the underbody structure;
    a rear cross member defining an opposite rearward end of the underbody structure;
    a first side member coupled between the front cross member and the rear cross member;
    a second opposite side member coupled between the front cross member and the rear cross member;
    at least one center cross member coupled between the first side member and the second side member;
    a first angled cross member oriented at a first predetermined acute angle relative to the rear cross member; and
    a second angled cross member oriented at a second predetermined acute angle relative to the rear cross member, the first and second angled cross members configured to match a load distribution of the vehicle cargo bed;
    wherein a first thickness of the first and second side members is greater than a second thickness of the front end member, which is greater than a third thickness of first and second angled cross members.

2. The underbody structure of claim 1, wherein the first thickness is between approximately 1.0 mm and approximately 1.1 mm, the second thickness is between approximately 0.85 mm and approximately 0.95 mm, and the third thickness is between approximately 0.75 mm and 0.85 mm.

3. The underbody structure of claim 1, wherein the first angled cross member is coupled between the rear cross member and the first side member, and the second angled cross member is coupled between the rear cross member and the second side member such that the first and second angled cross members are positioned between the center cross member and the rear cross member.

4. The underbody structure of claim 1, wherein the underbody structure comprises only one center cross member and only the first and second angled cross members positioned between the rear cross member and the center cross member.

5. The underbody structure of claim 1, further comprising a front zone cross member coupled between the first side member and the second side member and positioned between the center cross member and the front cross member.

6. The underbody structure of claim 5, wherein the underbody structure comprises only one front zone cross member.

7. The underbody structure of claim 1, wherein the front cross member, the first and second side members, and the first and second angled cross members each have a closed, rectangular cross section, and wherein the first and second angled cross members extend at an acute angle relative to the rear cross member, the respective side members, the center cross member and a central longitudinal axis of the vehicle.

8. The underbody structure of claim 7, wherein a cross section of the front cross member includes a width between approximately 65 mm and approximately 75 mm, and a height between approximately 70 mm and approximately 80 mm,
    wherein a cross section of the first and second side members includes a width between approximately 70 mm and approximately 80 mm, and a height between approximately 60 mm and approximately 70 mm, and
    wherein a cross section of the first and second angled cross members includes a width between approximately 75 mm and approximately 85 mm, and a height between approximately 55 mm and approximately 65 mm.

9. An underbody structure for a vehicle cargo bed, the underbody structure comprising:
    a front cross member defining a forward end of the underbody structure;
    a rear cross member defining an opposite rearward end of the underbody structure;
    a first side member coupled between the front cross member and the rear cross member;
    a second opposite side member coupled between the front cross member and the rear cross member;
    at least one center cross member coupled between the first side member and the second side member;
    a first angled cross member oriented at a first predetermined acute angle relative to the rear cross member; and
    a second angled cross member oriented at a second predetermined acute angle relative to the rear cross member, the first and second angled cross members configured to match a load distribution of the vehicle cargo bed,
    wherein the front cross member, the first and second side members, and the first and second angled cross members each have a closed, rectangular cross section, and wherein the first and second angled cross members extend at an acute angle relative to the rear cross member, the respective side members, the center cross member and a central longitudinal axis of the vehicle,
    wherein a cross section of the front cross member includes a width between approximately 65 mm and approximately 75 mm, and a height between approximately 70 mm and approximately 80 mm, wherein a cross section of the first and second side members includes a width between approximately 70 mm and approximately 80 mm, and a height between approximately 60 mm and approximately 70 mm, and wherein a cross section of the first and second angled cross members includes a width between approximately 75 mm and approximately 85 mm, and a height between approximately 55 mm and approximately 65 mm.

10. A vehicle comprising:

a chassis; and a truck box underbody structure supported by the chassis, the truck box underbody structure comprising:
- a front cross member defining a forward end of the underbody structure;
- a rear cross member defining an opposite rearward end of the underbody structure;
- a first side member coupled between the front cross member and the rear cross member;
- a second opposite side member coupled between the front cross member and the rear cross member;
- at least one center cross member coupled between the first side member and the second side member and between the front and rear cross members;
- a first angled cross member oriented at a first predetermined acute angle relative to the rear cross member; and
- a second angled cross member oriented at a second predetermined acute angle relative to the rear cross member, the first and second angled cross members configured to match a load distribution of the vehicle cargo bed;

wherein the first angled cross member is coupled between the rear cross member and the first side member, and the second angled cross member is coupled between the rear cross member and the second side member such that the first and second angled cross members are positioned between the center cross member and the rear cross member.

11. The vehicle of claim 10, further comprising a box floor panel supported by the truck box underbody structure.

12. The vehicle of claim 10, wherein the underbody structure comprises only one center cross member.

13. The vehicle of claim 10, wherein the front cross member, the first and second side members, and the first and second angled cross members each have a closed, rectangular cross section, and wherein the first and second angled cross members extend at an acute angle relative to the rear cross member, the respective side members, the center cross member and a central longitudinal axis of the vehicle.

14. The vehicle of claim 10, wherein the front cross member is oriented substantially perpendicular to the first and second side members.

15. The vehicle of claim 10, further comprising a front zone cross member coupled between the first side member and the second side member.

16. The vehicle of claim 15, wherein the underbody structure comprises only one front zone cross member and only the first and second angled cross members positioned between the rear cross member and the center cross member.

* * * * *